UNITED STATES PATENT OFFICE.

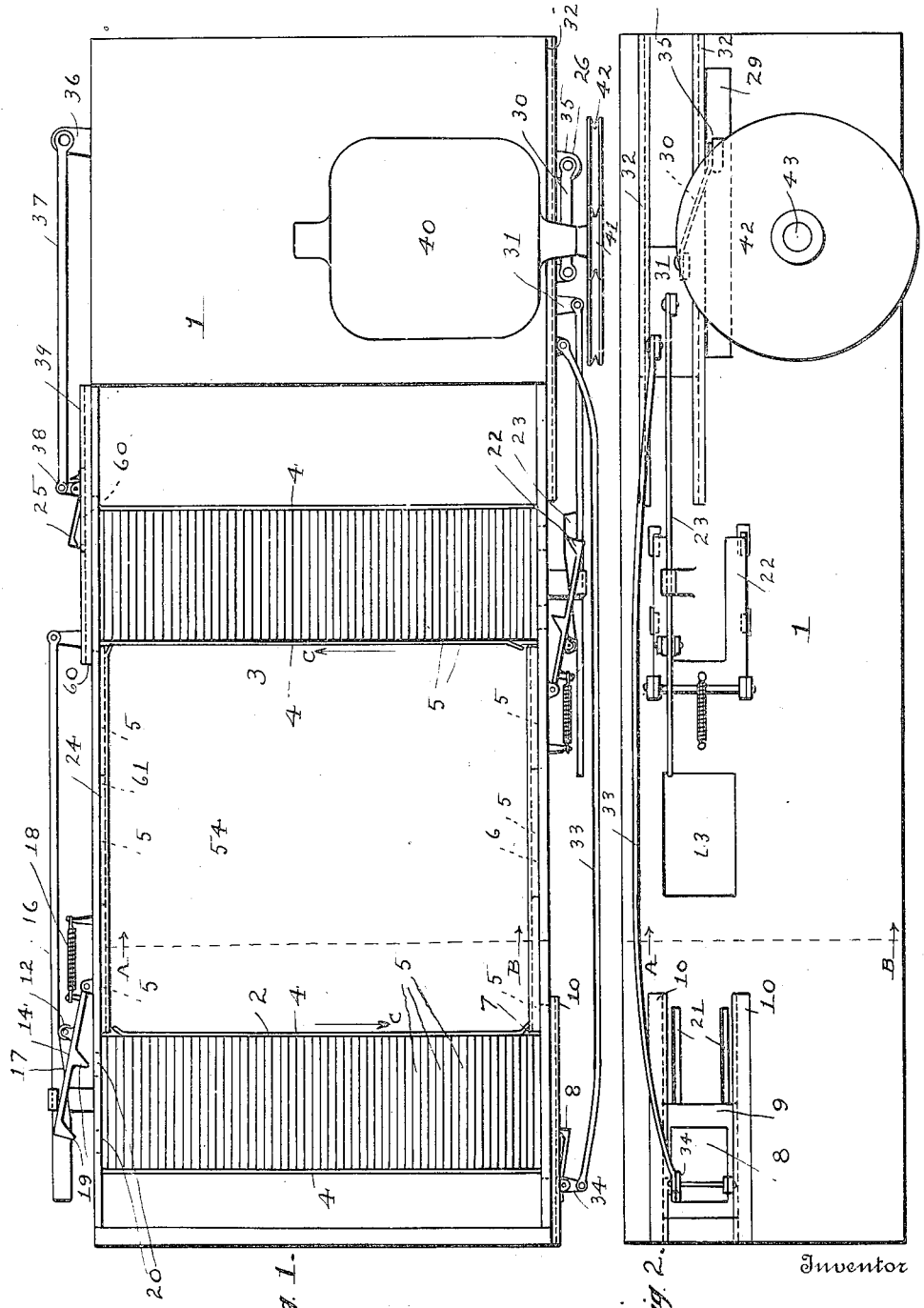

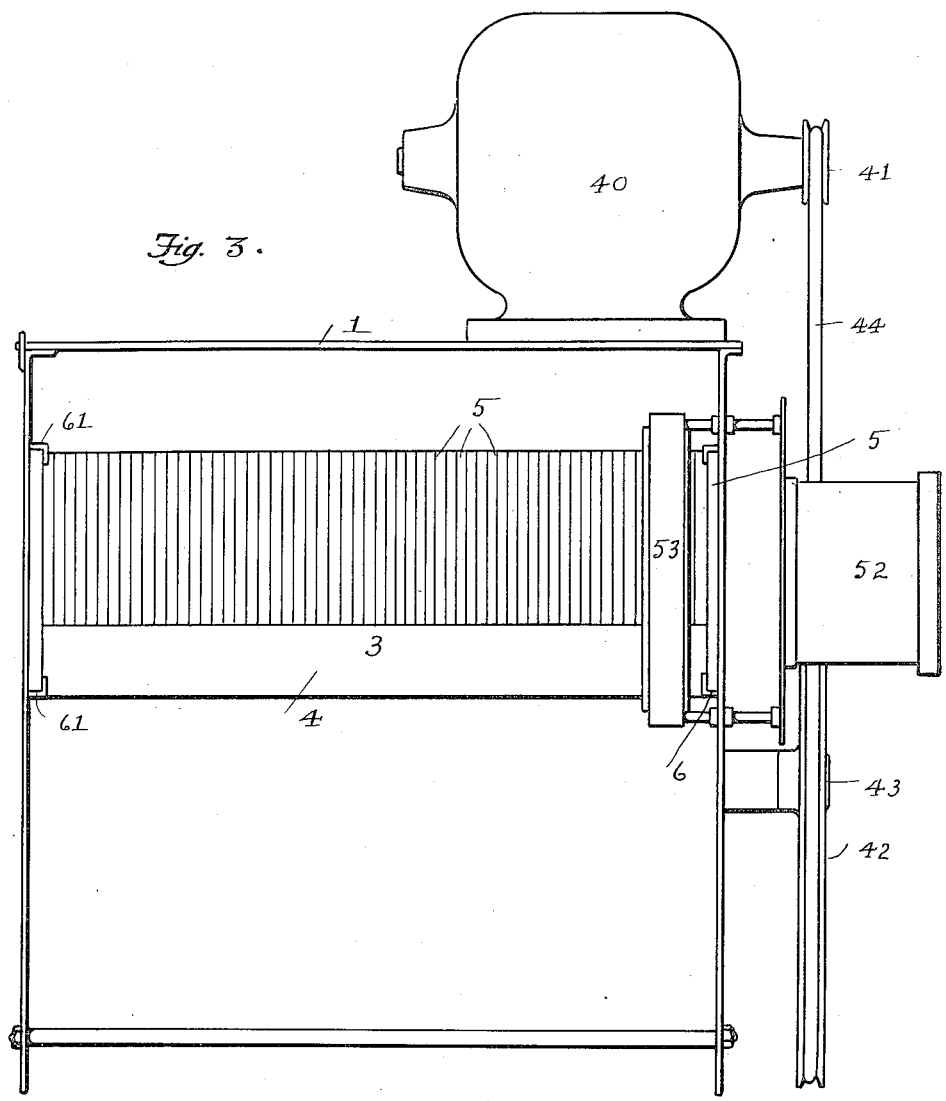
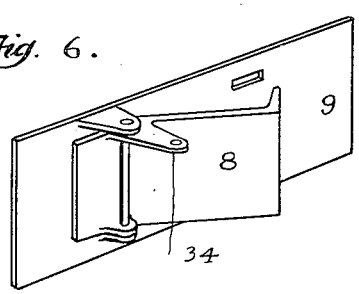

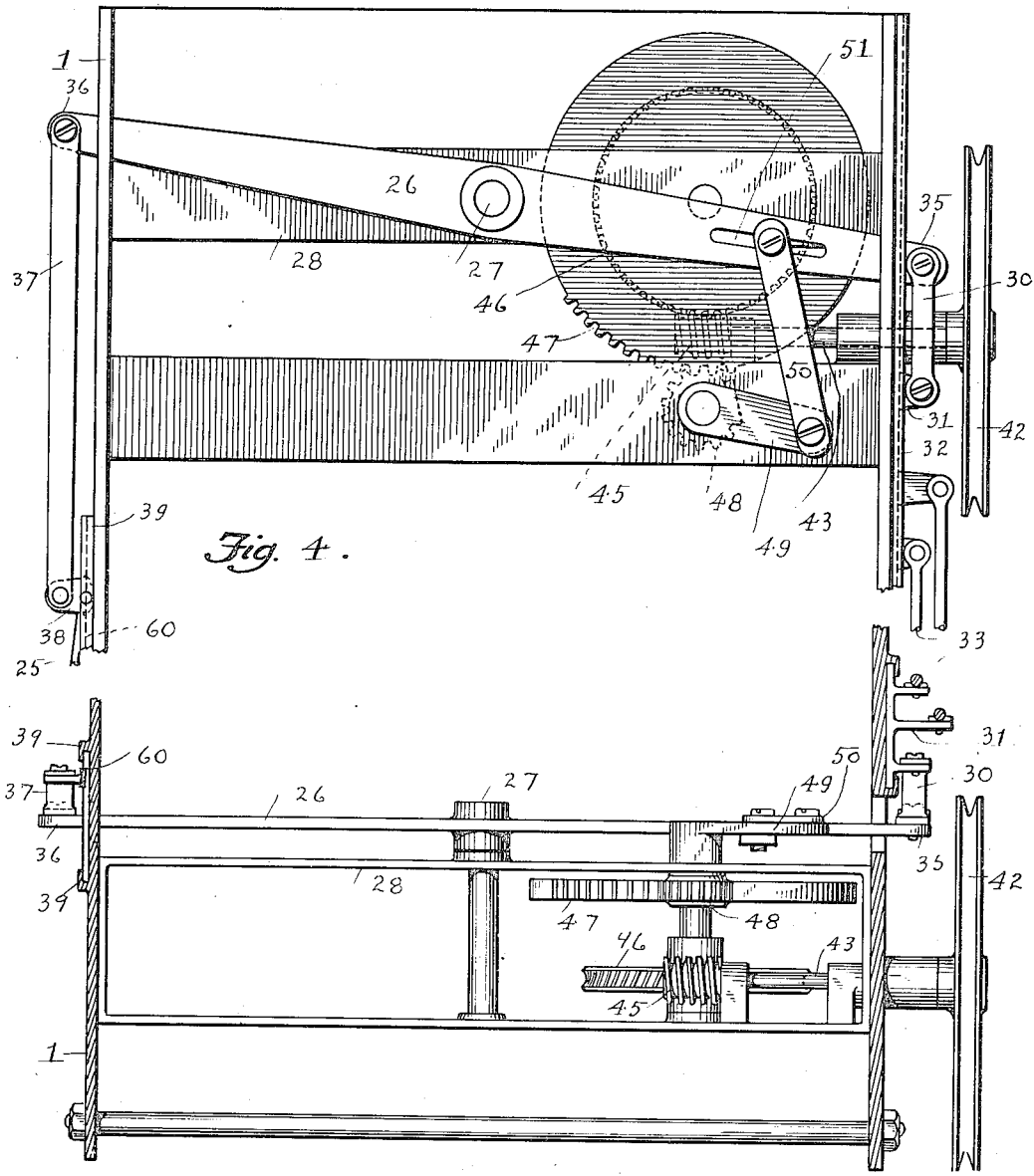

JASPER H. STANFIELD, OF MUSKEGON, MICHIGAN, ASSIGNOR TO VERNOR B. CUTLER, OF GRAND RAPIDS, MICHIGAN.

OPTIC OR PHOTOGRAPHIC INSTRUMENT.

1,288,730.

Specification of Letters Patent.   Patented Dec. 24, 1918.

Application filed December 6, 1915.   Serial No. 65,208.

*To all whom it may concern:*

Be it known that I, JASPER H. STANFIELD, a citizen of the United States, residing at Muskegon, in the county of Muskegon and State of Michigan, have invented new and useful Improvements in Optic or Photographic Instruments, of which the following is a specification.

The present invention relates to optic or photographic instruments, such as magic lanterns, moving-picture cameras and the like, and its object is to provide improved means for moving the plates of such instruments from a magazine into their severally exposed position; and further, for moving such plates from a raceway into a secondary magazine; and further, for returning such plates from the secondary to the primary magazine.

These, and any other objects appearing hereinafter, are attained by, and the invention finds preferable embodiment in, the structure hereinafter described and illustrated in the accompanying drawings, in which:—

Figure 1 is a top plan view of such structure with a portion of the top casing removed:

Fig. 2 is a front view of the same:

Fig. 3 is a vertical section of the same taken on line A—B of Figs. 1 and 2:

Fig. 4 is a top plan view of certain parts of the operating mechanism:

Fig. 5 is a side view of the same; and

Fig. 6 is a view in perspective of a plate-moving pawl and its supporting member.

In the embodiment of the invention chosen for illustration by the drawings and detailed description herein, the casing 1, serving as a camera in the use of the device in photography, contains a magazine 2 sometimes hereinafter specifically referred to as the "primary" magazine, and another magazine 3 hereinafter referred to as the "secondary" magazine. Each of these magazines, by means of their side portions 4 up-turned from their floors, forms a guide in which a plurality of plates 5 arranged therein side by side are adapted to be slidably moved in mass in the sidewise direction of the several slides, such direction of movement in the several magazines being indicated by arrows C on the drawings. A raceway 6 in the fore part of the machine is adapted to receive the plates severally from the front of the mass of plates contained in the magazine 2, the opening 7 through one side of the magazine being only large enough to permit a single plate at a time to be slid off of the mass into the raceway. The front plate of the mass is thus slid edgewise along the raceway by a swinging pawl 8 pivoted on a supporting member 9 slidable in bearings 10, the pawl being adapted to engage through the slots 21 and behind the rear edge of said front plate when the member 9 has been moved to its limit toward the left hand of Figs. 1 and 2. In the construction shown, the raceway accommodates five plates end to end (three of which are between the magazines), and the rearmost plate in such raceway pushes along those which are at the time in the raceway in front of it, the middle plate being opposite to the exposing opening 13 through the casing in the interval between successive movements of the plates in the raceway, the foremost or fifth plate being opposite to the mouth of the secondary magazine. A swinging arm 14 pivoted on the rear of the casing is swung by a sliding cam member 16, (whose cam surface 17 bears on the arm's roller 12) against the pressure of a spring 18—when a front plate has been removed from the forward end of the mass in magazine 2 as above described—and its projections 19 moving through the orifices 20 in the rear wall of the casing strike against the hindmost plate and push it and thereby the mass of plates in front of it forward a distance sufficient to move the then foremost plate in the magazine 2 into the raceway 6.

That plate in this raceway which is opposite to the mouth of the secondary magazine is pushed sidewise into the secondary magazine by a swinging arm 22 pivotally mounted on the fore part of the casing and similar in construction and in its operation (by a cam member 23) to the arm 14: and the plates are returned from the secondary to the primary magazine along a raceway 24, similar to raceway 6, and by a swinging pawl 25 similar to and operated like pawl 8; the magazines, raceways and means for moving the plates from one magazine to the other being essentially alike.

The pawls and swinging arms may be operated to move the plates, and coöperatingly, and the action of such parts may be properly timed interrelatively by various means: preferably however, such means comprise a rocking lever 26 centrally fulcrumed at 27 on a support 28 carried inside the casing. This lever extends through similar slots in the front and rear of the casing, the slot in the front being shown at 29. To the front end 35 of the lever is pivoted a rod 30 whose other end is pivoted to a member 31 slidable in bearings 32. To this member is pivoted a rod 33 whose other end is pivoted to an arm 34 of the pawl 8, and when this member is at its limit of travel toward the left hand side of Figs. 1 and 2, the right-hand movement of said rod throws the pawl into engagement with the last plate in the raceway 6, and thereupon by such continued right-hand movement slides the plates along the raceway, the reverse movement of the member 31 causing the pawl to release such plate. The cam member 23 is also connected to the member 31 and by the movement of said member 31, toward the left hand in Figs. 1 and 2 operates the swinging arm 22 to push the plate opposite the mouth of the secondary magazine into such magazine, just before the pawl 8 acts to move the plates along the raceway.

To the rear end 36 of the lever 26 is pivoted a rod 37 whose other end is pivoted to the arm 38 of the pawl 25 whose supporting member 60, similar to the supporting member 9 of pawl 8, slides in bearings 39 on the rear of the casing. To the member 60 is connected the cam member 16 which operates the swinging arm 14; the parts operated by the rear end of the lever 26 thus operate to move the plates along the raceway 61 and into the primary magazine in the same way as similar parts at the fore part of the machine operate to move them into the secondary magazine.

The lever 26 may be swung back and forth by suitable means, operated by suitable power: such power may be the motor indicated at 40 whose pulley 41 and the pulley 42 on the shaft 43 carry a belt 44. This shaft has a worm 45 meshing with a worm gear 46 whose shaft carries a mutilated gear 47. This gear meshes with a mutilated gear 48 whose shaft carries a crank arm 49. The continued rotation of the arm swings the lever 26 back and forth, by a link 50 pivoted to the crank arm and to the lever. The pivotal connection of this link to the lever may be adjustably moved in the longitudinal direction of the lever, as in the lever's slot 51, in order to accurately adjust the distance the ends of the lever are to be moved by the link. It will be seen that in the intervals between the meshing of the teeth of the mutilated gears, the plate is exposed opposite the opening 13. The mounting of the lens is indicated at 52, and that of the "condenser" and the position of the lamp, in the use of the device as a magic lantern, are indicated at 53 and 54 respectively. It will be understood that the device may be used merely to display the plates successively to view, and without such parts as are necessary in a magic lantern or photographic instrument.

It will be seen that the pawls which move the plates endwise in the raceways are swung away from contact with the plates during the pawls' return longitudinal movement, so that the plates are not scratched thereby.

The invention being intended to be defined solely by the claims, is not to be limited by details of construction shown or described.

What is claimed is:

1. In a device of the character described; a magazine adapted to contain a plurality of plates side by side; a raceway adapted to receive the plates from the magazine; means for moving the plates in the magazine in the sidewise direction of the several plates and in mass toward and severally into the raceway, and operating pushingly against the side of a plate; and means for moving the plates in mass endwise and abutting end to end in the raceway into severally exposed position, said means engaging the rear plate in the raceway.

2. In a device of the character described; a magazine adapted to contain a plurality of plates side by side; a raceway adapted to receive the plates from the magazine; means for moving the plates in the magazine in the sidewise direction of the several plates and in mass toward and severally into the raceway; and operating pushingly against the side of a plate; means for moving the plates in mass endwise and abutting end to end in the raceway into severally exposed position, said means engaging the rear plate in the raceway; and mechanism for operating said severally-mentioned means from a single source of power.

3. In a device of the character described; a primary magazine adapted to contain a plurality of plates side by side; a raceway adapted to receive the plates from the primary magazine; means for moving the plates in the primary magazine in the sidewise direction of the several plates and in mass toward and severally into the raceway, and operating pushingly against the side of a plate; a secondary magazine adapted to contain a plurality of plates side by side and to receive the plates from the raceway; means for moving the plates severally and in their sidewise direction from the raceway into the secondary magazine; and means for moving the plates in mass endwise and abutting end to end in the raceway into and out of their severally exposed position in a travel from the primary to the secondary magazine, said means engaging the rear plate in the raceway.

4. In a device of the character described; a primary magazine adapted to contain a plurality of plates side by side; a raceway adapted to receive the plates from the primary magazine; means for moving the plates in the primary magazine in the sidewise direction of the several plates and in mass toward and severally into the raceway, and operating pushingly against the side of a plate; a secondary magazine adapted to contain a plurality of plates side by side and to receive the plates from the raceway; means for moving the plates severally and in their sidewise direction from the raceway into the secondary magazine; means for moving the plates in mass endwise and abutting end to end in the raceway into and out of their severally exposed position in a travel from the primary to the secondary magazine, said means engaging the rear plate in the raceway; and mechanism for operating said severally-mentioned means from a single source of power.

5. In a device of the character described; a primary magazine adapted to contain a plurality of plates side by side; a raceway adapted to receive the plates from the primary magazine; means for moving the plates in the primary magazine in the sidewise direction of the several plates and in mass toward and severally into the raceway, and operating pushingly against the side of a plate; a secondary magazine adapted to contain a plurality of plates side by side and to receive the plates from the raceway; means for moving the plates severally and in their sidewise direction from the raceway into the secondary magazine; means for moving the plates in mass endwise and abutting end to end in the raceway into and out of their severally exposed position in a travel from the primary to the secondary magazine, said means engaging the rear plate in the raceway; and means for returning the plates from the secondary to the primary magazine.

6. In a device of the character described; a primary magazine adapted to contain a plurality of plates side by side; a raceway adapted to receive the plates from the primary magazine; means for moving the plates in the primary magazine in the sidewise direction of the several plates and in mass toward and severally into the raceway, and operating pushingly against the side of a plate; a secondary magazine adapted to contain a plurality of plates side by side and to receive the plates from the raceway; means for moving the plates severally and in their sidewise direction from the raceway into the secondary magazine; means for moving the plates in mass endwise and abutting end to end the raceway, into and out of their severally exposed positions in a travel from the primary to the secondary magazine; means for returning the plates from the secondary to the primary magazine, said means engaging the rear plate in the raceway; and mechanism for operating said severally-mentioned means from a single source of power.

7. In a device of the character described; a magazine adapted to contain a plurality of plates side by side; a raceway adapted to receive the plates from the magazine; a swinging arm adapted to be swung to pushingly engage against the side of a plate and move the plates in the magazine in the sidewise direction of the several plates and in mass toward and severally into the raceway; and a longitudinally-movable and swinging pawl adapted to be swung to engage a plate in the raceway and to move the same endwise along the raceway; and means for holding the pawl away from the plate during the pawl's return longitudinal movement.

8. In a device of the character described; a magazine adapted to contain a plurality of plates side by side; a raceway adapted to receive the plates from the magazine; a swinging arm adapted to be swung to pushingly engage against the side of a plate and move the plates in the magazine in the sidewise direction of the several plates and in mass toward and severally into the raceway; a longitudinally-movable and swinging pawl adapted to be swung to engage a plate in the raceway and to move the same endwise along the raceway; and means for holding the pawl away from the plate during the pawl's return longitudinal movement and mechanism for operating said arm and pawl from a single source of power.

9. In a device of the character described; a primary magazine adapted to contain a plurality of plates side by side; a raceway adapted to receive the plates from the primary magazine; a swinging arm adapted to be swung to pushingly engage against the side of a plate and move the plates in the primary magazine in the sidewise direction of the several plates and in mass toward and severally into the raceway; a secondary magazine adapted to contain a plurality of plates side by side and to receive the plates from the raceway; a longitudinally-movable and swinging pawl adapted to be swung to engage a plate in the raceway and to move the plates endwise in the raceway into and out of their severally exposed position in a travel from the primary to the secondary magazine; means for returning the plates from the secondary to the primary magazine; a rocking lever; and means for holding the pawl away from the plate during the pawl's return longitudinal movement and connections between the lever and the arm, pawl and said returning means for operating the same by the rocking of the lever.

In testimony whereof I have hereunto set my hand in presence of two subscribing witnesses.

JASPER H. STANFIELD.

Witnesses:
 CYRUS W. RICE,
 GANSON TAGGART.